(12) United States Patent
George

(10) Patent No.: US 9,297,999 B2
(45) Date of Patent: Mar. 29, 2016

(54) SYNTHETIC FOCAL PLANE IMAGER

(76) Inventor: Jonathan K. George, Arlington, VA (US)

(*) Notice: Subject to any disclaimer, the term of this patent is extended or adjusted under 35 U.S.C. 154(b) by 323 days.

(21) Appl. No.: 13/992,847

(22) PCT Filed: Dec. 12, 2011

(86) PCT No.: PCT/US2011/064408
§ 371 (c)(1),
(2), (4) Date: Jun. 10, 2013

(87) PCT Pub. No.: WO2012/079074
PCT Pub. Date: Jun. 14, 2012

(65) Prior Publication Data
US 2013/0256518 A1    Oct. 3, 2013

Related U.S. Application Data

(60) Provisional application No. 61/422,146, filed on Dec. 11, 2010.

(51) Int. Cl.
*G01J 3/28* (2006.01)
*G02B 26/02* (2006.01)

(52) U.S. Cl.
CPC .............. *G02B 26/023* (2013.01); *G02B 26/02* (2013.01)

(58) Field of Classification Search
CPC .. G02B 21/0032; G02B 26/023; G02B 26/02; G02B 26/00; G02B 26/04; G02B 5/005; G02B 26/0841; G02B 21/0044; G01D 5/38; G01D 5/36; G02F 1/00; G02F 1/01; G01J 3/02; G01J 3/2846; G01J 2003/2866; G01J 3/457; G01J 3/04; G01J 2001/067; G01J 2001/063; G01J 1/04; G01J 1/06; G01J 3/28; G01J 3/2823; G02J 3/18; A61B 3/135; G03B 9/06

USPC ........ 250/237 R, 336.1, 358.1, 216; 356/310, 356/324, 326, 328, 330; 359/227, 232–235; 348/296, E5.091
See application file for complete search history.

(56) References Cited

U.S. PATENT DOCUMENTS

| | | |
|---|---|---|
| 5,651,784 A | 7/1997 | Klopotek |
| 6,008,492 A | 12/1999 | Slater et al. |

(Continued)

OTHER PUBLICATIONS

PCT International Search Report and Written Opinion for PCT International Application No. PCT/US2011/064408, dated Apr. 2, 2012.

*Primary Examiner* — Kevin Pyo
(74) *Attorney, Agent, or Firm* — J.A. Lindeman & Co., PLLC

(57) ABSTRACT

A synthetic focal plane imaging system senses electromagnetic radiation as a distribution of energy over time rather than as a distribution of energy over space. A spatial context independent of the energy detection is developed. The synthetic focal plane imaging system includes an aperture, a mask, an electromagnetic sensor, and a computer configured to receive sample energy data and shutter modeling data from the mask to generate hyperspectral images. The synthetic focal plane imaging system incorporates a spiral rotating mask to create theta-space rotational masking architectures resulting in simple cyclical linear equations that can be processed quickly and efficiently to generate the hyperspectral images. The system captures image content at multiple wavelengths, electronically processes the resulting data as an image cube with stacked layers of images. Each layer corresponds to a particular wavelength of the imaged object with the same physical locations arranged on top of each other to form the stack.

20 Claims, 18 Drawing Sheets

(56) References Cited

U.S. PATENT DOCUMENTS

| | | |
|---|---|---|
| 7,149,366 B1 | 12/2006 | Sun |
| 7,388,712 B2 | 6/2008 | Lee et al. |
| 7,420,679 B2 | 9/2008 | Treado et al. |
| 7,835,002 B2 | 11/2010 | Muhammed et al. |
| 2004/0080754 A1 | 4/2004 | Tobiason et al. |
| 2004/0240065 A1 | 12/2004 | Someno et al. |
| 2007/0097363 A1 | 5/2007 | Brady et al. |
| 2010/0013971 A1 | 1/2010 | Amano |

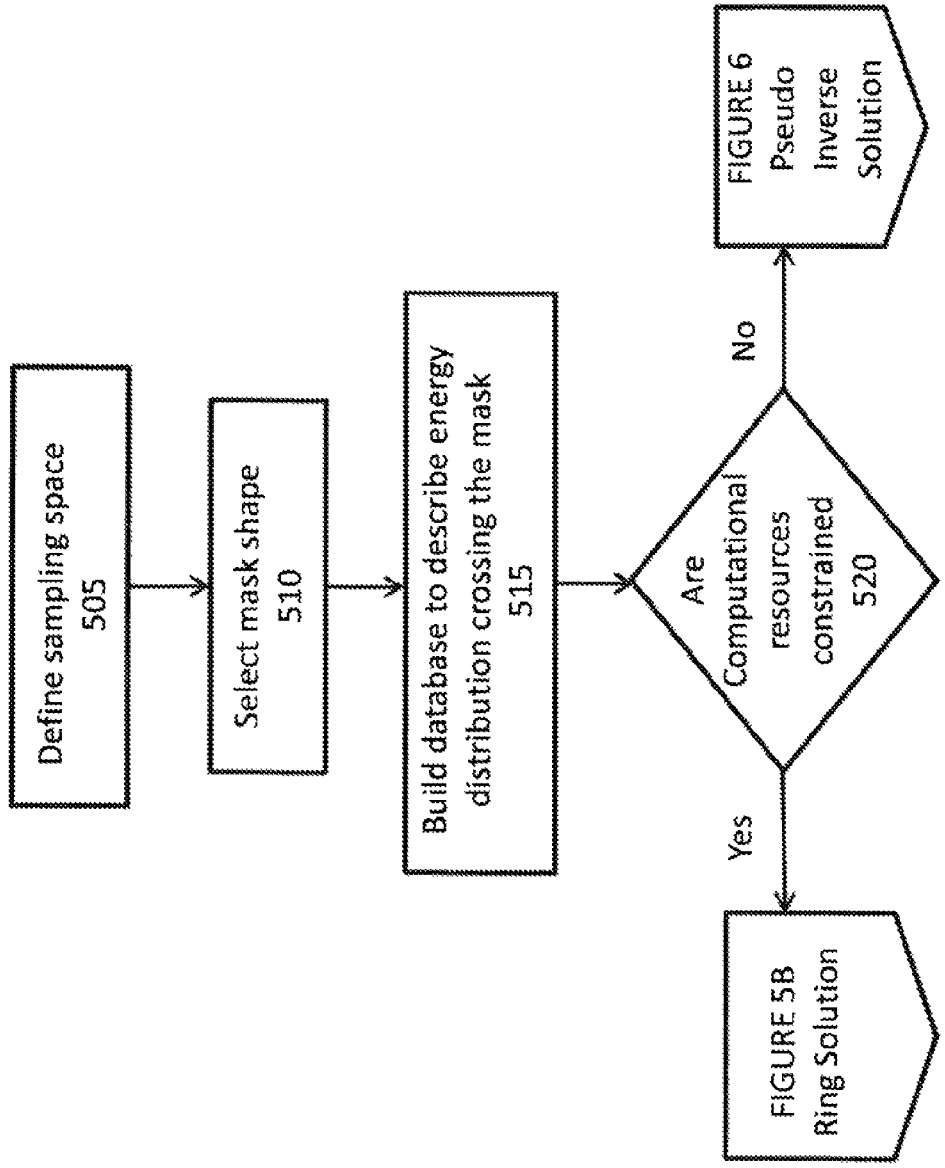

SYNTHETIC FOCAL PLANE IMAGER

CROSS-REFERENCE TO RELATED APPLICATION

This application claims benefit of priority of U.S. Provisional Patent Application Ser. No. 61/422,146 filed on Dec. 11, 2010, the entire disclosure of which is incorporated herein by reference.

TECHNOLOGICAL FIELD

This technology generally relates to hyperspectral imaging, and more particularly, to systems and methods for a plane array imager that captures a full frequency range without a lens and array.

BACKGROUND

Hyperspectral imaging (HSI) technology takes advantage of the wavelength composition of electromagnetic radiation (EMR). Almost all electromagnetic radiation, including visible light, is comprised of a mixture of many different wavelengths of EMR. Electromagnetic waves embody the physical interaction between an electric field and a magnetic field that creates the wave. Electromagnetic waves can be in the form of visible light but can also include X-rays, gamma rays, microwaves, radio waves, and other spectra of electromagnetic radiation. These forms of electromagnetic radiation are distinguished by their wavelengths.

Wavelengths of interest for HSI can range from the low end of the visible spectrum (violet) through the high end of the visible spectrum (red), through near-infrared (NIR), short-wave infrared (SWIR) and mid-wave infrared (MWIR) to long-wave infrared (LWIR). Long-wave infrared is also called thermal infrared. Most HSI systems utilize only part of this wavelength range of interest.

When electromagnetic radiation strikes an object such as a solid, a liquid, or a gas, the electromagnetic radiation can be reflected, absorbed, transmitted, or some combination of two or more of these processes. When EMR is reflected, the EMR is turned back from the surface of the object (substance). When EMR is absorbed, the EMR is received and taken in by the substance. When EMR is transmitted, the EMR passes through the substance. For example, when light (visible EMR) strikes a body of water, some of the light is reflected. An observer can see their reflection in the water. Some of the light striking the water is absorbed. The energy of the light warms the water and decreases the intensity of the light as it travels through the water. Finally, some of the light is transmitted through the water, enabling the observer to see the bottom of the pool. The physical characteristics of the substance (that is, the water) and the wavelength of the EMR determine how much of the EMR is reflected, how much of the EMR is absorbed, and how much of the EMR is transmitted.

EMR often includes a mixture of electromagnetic radiation of different wavelengths. A prism can be used to separate EMR that is comprised of a mixture of different wavelengths into its constituent wavelengths. Likewise, a diffraction grating can also be used to disperse EMR into its spectrum. A diffraction grating is often a material with a reflective surface onto which thousands of very fine, parallel grooves have been etched. The grooves are etched at specific angles, and high-precision diffraction gratings can have over a thousand grooves per millimeter on their surface. The grooves reflect incident EMR into its spectrum. Diffraction gratings provide more accurate and more consistent spectral dispersion than prisms. The wavelengths that are dispersed by the grating can be controlled by the angle, width, and spacing of the grooves of the diffraction grating. In a hyperspectral sensor, EMR is captured and focused onto a diffraction grating, and the diffraction grating spreads the incident electromagnetic radiation into its constituent wavelengths. By using a diffraction grating, the wavelength spread is predictable and very accurate.

After an EMR spectrum is dispersed, it can be divided into separate bands, and the intensity of the EMR in each of the bands can be measured. By spreading the EMR into its spectrum and then measuring the intensity of its different wavelengths, a user can differentiate between different EMR samples that would otherwise appear to be the same. The process of measuring the intensity of wavelengths in an EMR sample provides the ability to detect specific combinations of wavelengths. That is, the spectrum of EMR reflected by an object is used to detect and determine the composition of the object. The spectrum of EMR reflected by an object depends upon the EMR used to illuminate the object and the reflectance of the object. Each object's reflectance can be plotted as a function of wavelength to provide a spectral signature of the object. A hyperspectral system can then detect objects by comparing the measured reflected EMR with a library of spectral signatures. When a match is found, the object is identified.

The EMR that reflects from the diffraction grating is directed to a set of collectors that converts the incident light of various wavelengths into electrical signals. The collectors can be contained on an electronic chip that is very much like the electronic chips that are found in digital cameras, except the chips in an HSI collector (sensor) are usually sensitive to much wider ranges of EMR while a digital camera is sensitive only to visible light. The electrical signals from the chip are passed to a computer that processes the data and presents the user with information that can be used to reach conclusions about the source of the captured EMR, that is, the identity of the object reflecting the EMR.

HSI sensors receive the EMR and convert it to electrical signals. HSI sensors use lenses that focus the incoming EMR, a slit that limits the incoming EMR to a thin (but wide) beam, a diffraction grating that disperses the thin wide beam into its spectra, and photo-receptors that collect the EMR in specific wavelength bands and convert the band intensities to electrical signals.

Spectra can be collected over an entire area encompassing the sample object simultaneously using an electronically tunable optical imaging filter such as an acousto-optic tunable filter or a liquid crystal tunable filter. The materials in optical filters produce the desired bandpass and transmission function. The spectra obtained for each pixel of the image forms a complex data set that is the hyperspectral image. The hyperspectral image can contain intensity values at numerous wavelengths.

In hyperspectral imaging systems, radiation reflected by or emanating from a target or specimen is detected in a large number of narrow contiguous spectral bands, producing a data set which is distributed not only spatially, but spectrally as well. That is, for each pixel within an image of the target, information is recorded in each of the spectral bands, thereby producing a three-dimensional hyperspectral image cube, a 3 angle dimension field, in which spectral information for each pixel is distributed across a spectral axis perpendicular to the spatial axes.

Image sensors capture image content at multiple wavelengths. The resulting data is formatted electronically as a data cube or image cube that includes stacked two-dimensional layers of images. Each layer corresponds to a particular wavelength of the imaged surface. The multiple wavelength images of the same physical location are arranged on top of each other to form the stack.

Hyperspectral imaging systems of this sort are often very complex, expensive, and large. They often require complex calibration and compensation to account for changing ambient illumination conditions, including conditions related to the illuminating EMR, atmospheric scattering, atmospheric absorption, the reflected EMR from the object, and the EMR that reaches the sensor. To correct for these shortcomings, HSI systems are often large, expensive and unwieldy devices that are unsuitable for active applications. These systems often have inherent design limitations related to motion of the associated transmission and reception platforms, motion or changes in the atmosphere, and/or motion of the objects in the image field that occur during scan sequences. These effects can lead to reduced resolution and ineffective observations. HSI systems include focal plane arrays that are expensive and difficult to create for large frequency bands and for low frequencies.

In view of the above, there is a need for an improved imaging system and method that overcomes the problems or disadvantages in the prior art.

SUMMARY

Most modern image sensors use a planar array to capture a spatial context for the EMR entering the sensor's aperture. The claimed invention senses light (EMR) as a distribution of energy over time rather than a distribution of energy over space. In this fashion, a spatial context independent of the energy detection is developed.

In this disclosure, electromagnetic radiation (EMR) is often described as "light." While EMR is energy in the form of electromagnetic waves, a familiar form of EMR is visible light. However, electromagnetic radiation includes more than visible light. For brevity and clarity, the description and examples in this disclosure refer to EMR as "light," but the claimed invention is not limited to this subset of electromagnetic radiation.

The claimed invention eliminates the sensor array and thereby enables the sensor to collect simultaneous views of wide ranges of the spectrum. By eliminating the focal plane array, the claimed invention is less expensive and provides improved response over many frequency bands, including low frequencies, such as sub-millimeter radiation and other electromagnetic radiation with frequencies between the high frequency edge of the microwave band and the long wavelength edge of far-infrared light. Other practical benefits include the absence of required lenses, the ability to separate the aperture and sensor via non-conformal optics, and the ability to extend the synthetic array to simultaneous 360° imaging. The synthetic focal plane imager of the claimed invention generates a spatial context of the light that defines the two-dimensional space configuration of the light rays before they enter the sensor. As such, the system (camera) of the present invention does not need a lens to reproduce an image. The synthetic focal plane imager of the claimed invention does not require a planar image at the focal point. Therefore, no lens is required to focus light in such a way that the image becomes planar in two-space at the focal point.

In contrast to a traditional HSI system, where sunlight illuminates objects on the ground and an aircraft or satellite with an HSI sensor lens collects the reflected light and focuses the light to form an image of the object, in the system of the claimed invention, the rays of reflected light are sampled over time to provide a spatial context.

To build an image using the system of the claimed invention, the sampling space of the reflected light must be defined, and the energy of the rays of the reflected light is examined to determine the distribution of the energy over the sampled space. The energy of the reflected light is examined using a mask. The mask extends over the sampled space and selectively blocks light. Masks can include an aperture or a slit. Masks in accordance with the claimed invention can be of different shapes and geometries. To examine the energy crossing the mask shape, each ray is sampled, and a database is built to describe the distribution of the energy vectors crossing the mask shape. The completed database maps the angles of the energy vectors (thetas) to a distribution of energy. The cell value of the database represents the energy at that pixel of the sensor. An optional virtual lens can be incorporated to allow the energy distribution to be computed at any desired focal distance.

Once the database is built to describe the energy distribution, the image is computed. The image can be computed by a number of methods, such as by building a 3 angle dimension field and sampling through the field in time, or by using least mean squares minimization to identify a solution set of linear equations where each sample of the image is a high dimensional element of the array. If computation power is unconstrained, a least mean squares technique can be employed. But in environments where computation power is limited, a 3 angle dimension field solution can be employed very effectively. A 3 angle dimension field solution is simpler computationally and is well-suited to a real-time environment where frames need to be produced as quickly as possible.

To compute the image using a 3 angle dimension field and sampling through the 3 angle dimension field in time, a ring solution can be employed. The 2D space is scanned using a ring, and power levels at each point in the 2D space are measured. These power levels are used to build the entire focal plane. Multiple ring solution systems can also be used concentrically to define a vector distribution of the power levels. The image can be computed using these vectors.

To compute the image using a least mean squares minimization, a solution set of linear equations can be identified where each sample of the image is a high dimensional element of the array (database). A pseudo inverse solution is used to identify the solution set. In using the pseudo inverse solution, a set of linear equations are defined where theta values of the mask are used to ray trace the distribution, or each cell of the matrix is mapped to a pixel in the array (database). Samples of the energy data are collected to the point where the pseudo inverse can be computed, and then the sample vector is multiplied by the pseudo inverse. That is, the pseudo inverse is used to solve for least mean squares approximation of the unknown image. The image output is then computed.

Correction for diffraction and Doppler Effect can be included in the process as well. Ray traced distributions can be pre-computed for values of the theta-space to reduce the time and complexity required in the complete ray trace by the capture device.

Hyperspectral imaging is difficult to perform accurately and effectively. The diverse $\mu$ permeability and $\in$ permittivity behaviors of different materials over different frequencies make it difficult to build a plane array imager that captures the full frequency range well. By eliminating the lens and the array, it is simpler to build a single synthetic array imager that can process a full spectrum of interest, including ultraviolet, visible light, infrared, THz, and the like.

Hyperspectral imaging is used in a number of applications including manufacturing, materials science, surveillance, remote sensing, agriculture, food safety, and medicine. Likewise, commercial applications are broad for a synthetic focal plane imager in accordance with the claimed invention. The synthetic focal plane imager has applications in these industries and environments as well.

For example, hyperspectral inspection can be used to inspect pharmaceuticals for counterfeiting and for quality control. Hyperspectral imaging systems can be used to improve quality and quantity in automating manufacturing by providing timely and accurate information about materials. The food industry can use hyperspectral imaging to inspect consumables such as seeds, poultry, fruits, and vegetables for defects, ripeness, grading, and contamination. Similarly, precision agriculture aims to identify and correct in-field variability in agricultural settings. The collected data can be used to understand crop health, weed and parasite locations, or fuel loading in forests. Hyperspectral imaging system can be deployed on both manned and unmanned aerial systems, including aircraft and satellites. Generating and analyzing geophysical hyperspectral data allows researchers to easily use established remote sensing techniques to study physical properties of the earth. Medical imaging in the non-visible frequencies is used in all types of diagnostics. Further, the cost savings of a synthetic array in infrared and radar applications makes it a viable alternative in surveillance and defense industry environments.

A synthetic array in accordance with the claimed invention challenges the status quo and provides an alternative approach to spatial sensing that is applicable to many scientific and industrial endeavors. With a synthetic array in accordance with the claimed invention, hyperspectral imaging can be employed in various applications in an effective manner that was previously unattainable due to the high cost of previous hyperspectral planar arrays.

BRIEF DESCRIPTION OF THE DRAWINGS

FIG. 5A shows a process flow chart for computing an image output using a ring algorithm and a pseudo inverse algorithm in accordance with the claimed invention

DETAILED DESCRIPTION

In the claimed invention, the rapid sampling of a small number of optical sensors lit through a rotary shutter is used to partition space over time. A number of imaging techniques can be used to project the distributed energy onto a virtual pixel array. One advantage of this synthetic focal plane imager system is that it uses as few as a single sensor to build the image. Reducing the number of sensors in an array simplifies aperture design and allows for low-cost high density imaging and hyper spectral imaging.

Synthetic Focal Plane Imaging System

Figure 10:
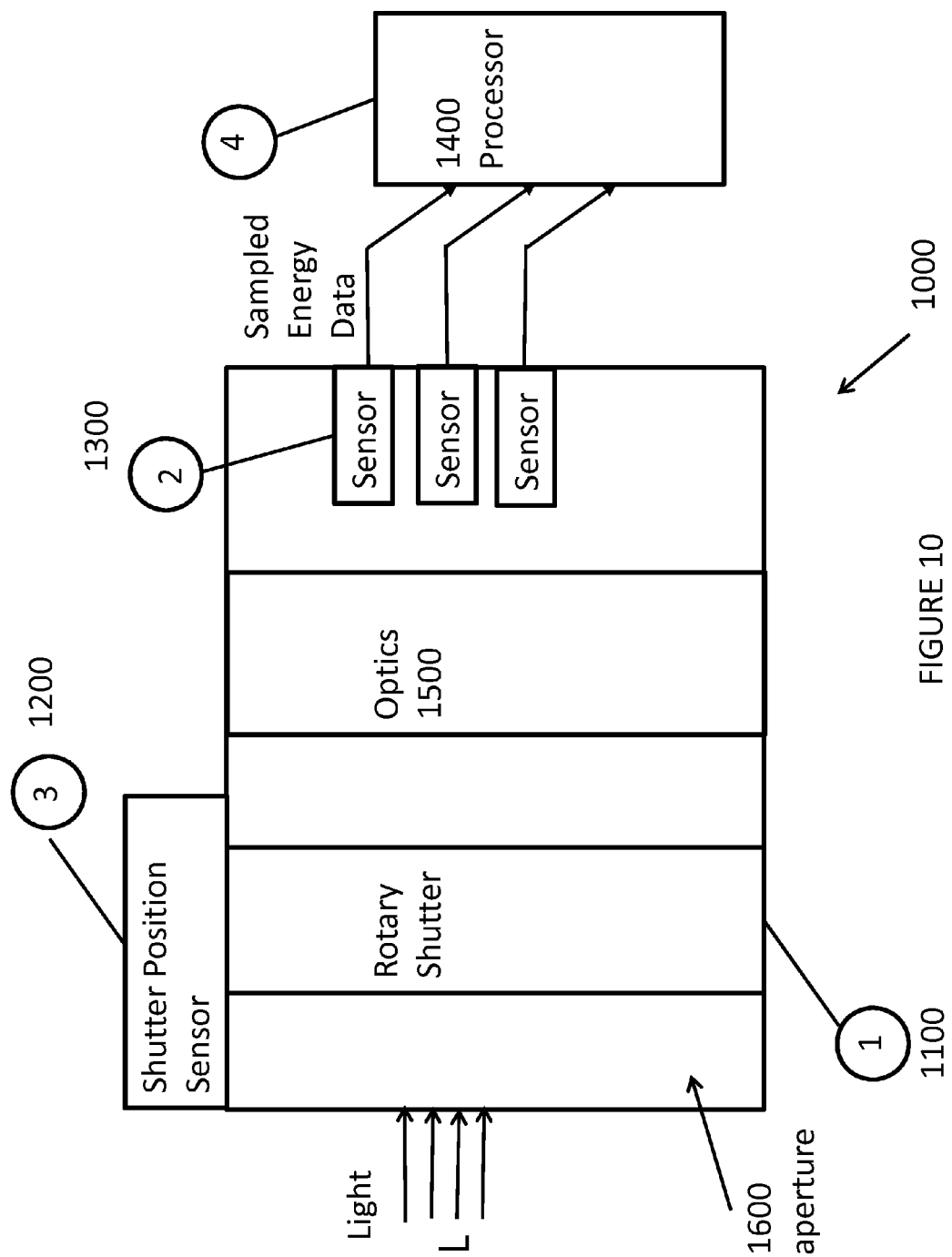
FIG. 10 shows a synthetic focal plane imager system in accordance with the claimed invention.

FIG. 10 shows an example of a synthetic focal plane imager system 1000 in accordance with the claimed invention. The system 1000 includes an aperture 1600, a rotary space slicing shutter 1100, shutter position sensor 1200, electromagnetic sensors 1300, and a computer device 1400 to process the energy from light L to form a hyperspectral image. The synthetic focal plane imager system 1000 also includes optional optics components 1500 for use in acquiring and processing energy rays from light L.

Figure 2A:
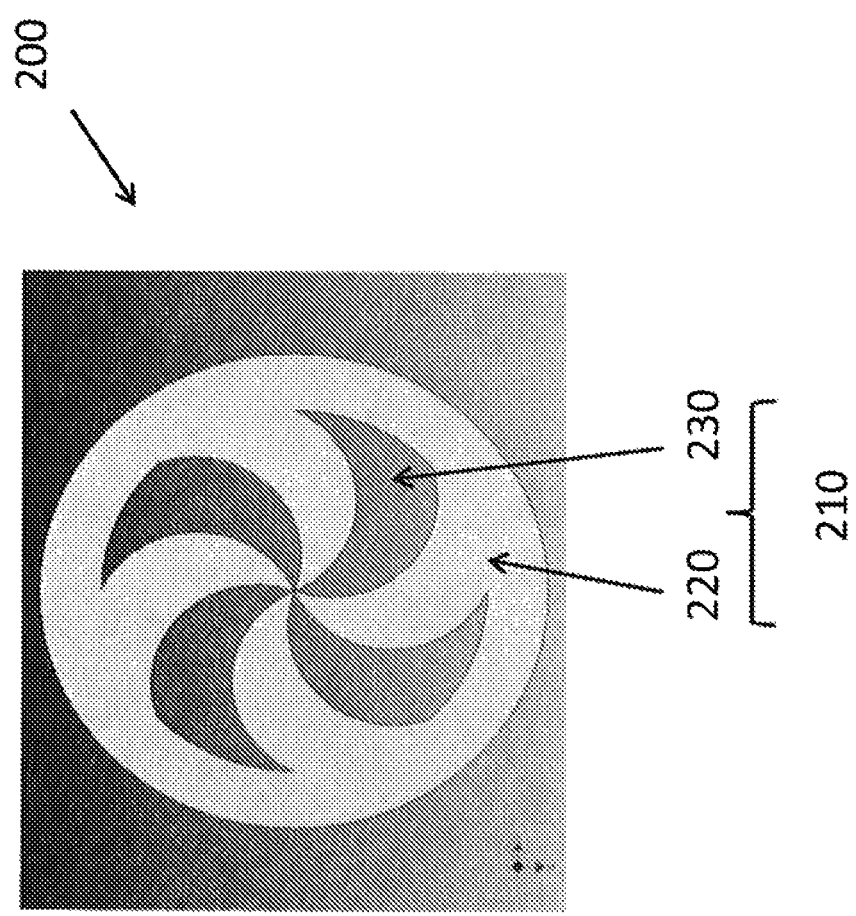
FIG. 2A illustrates a two-dimensional spiral mask in accordance with the claimed invention.
Figure 2D:
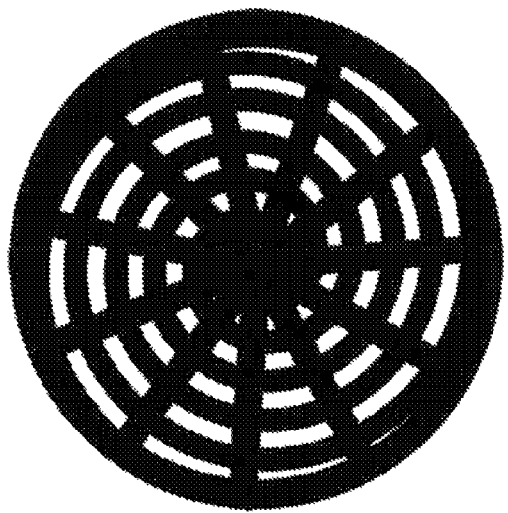
FIG. 2D illustrates a basic two-dimensional radial shutter mask and spiral shutter mask overlay in accordance with the claimed invention.
Figure 2C:
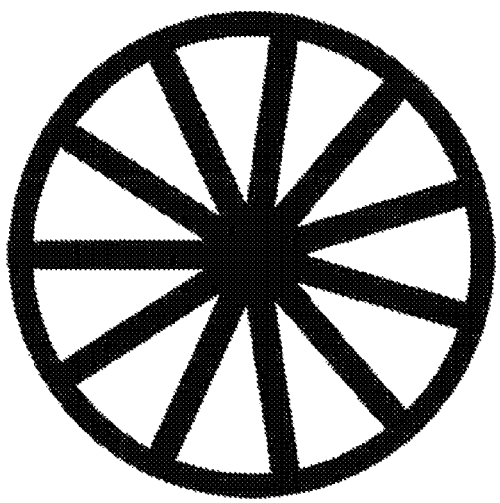
FIG. 2C illustrates a basic two-dimensional radial shutter mask in accordance with the claimed invention.
Figure 2B:
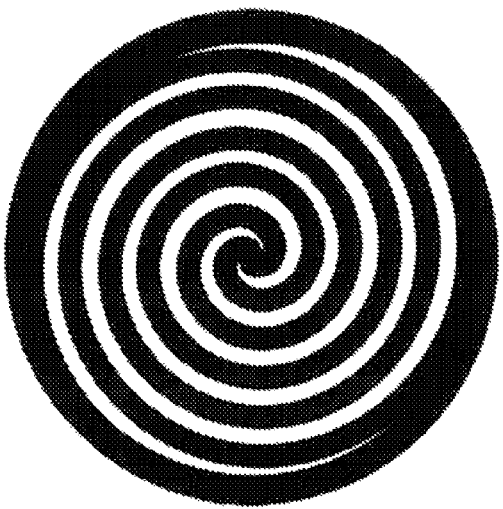
FIG. 2B illustrates a basic two-dimensional spiral shutter mask in accordance with the claimed invention.

As shown in FIG. 10, light L enters the synthetic focal plane imager system 1000 through aperture 1600 and through a rotary space slicing shutter 1100. In one example implementation, rotary space slicing shutter 1100 is a mask that includes two or more disks with a spiraling pattern of opaque or semi-opaque material interleaved with a transparent or semi-transparent material or cut in the shape of a spiral. An example implementation of a rotary space slicing shutter 1100 in accordance with the present invention is illustrated in two dimensions in FIG. 2A as disk 200. Disk 200 includes a spiraling pattern 210 of opaque material 220 interleaved with a transparent material 230. Disk 200 is rotated to provide a rotary space slicing shutter 1100 upon which light L is incident. Disk 200 can also be used in conjunction with an additional disk or disks, which can be interleaved in a radial pattern. For example, as shown in FIG. 2B, a basic two-dimensional spiral shutter mask can be used as well as a basic two-dimensional radial shutter mask as shown in FIG. 2C. Additionally, multiple disks can be used, or multiple disk patterns can be incorporated onto a single disk. For example, FIG. 2D illustrates a basic two-dimensional radial shutter mask and spiral shutter mask overlay in accordance with the claimed invention.

Figure 3:
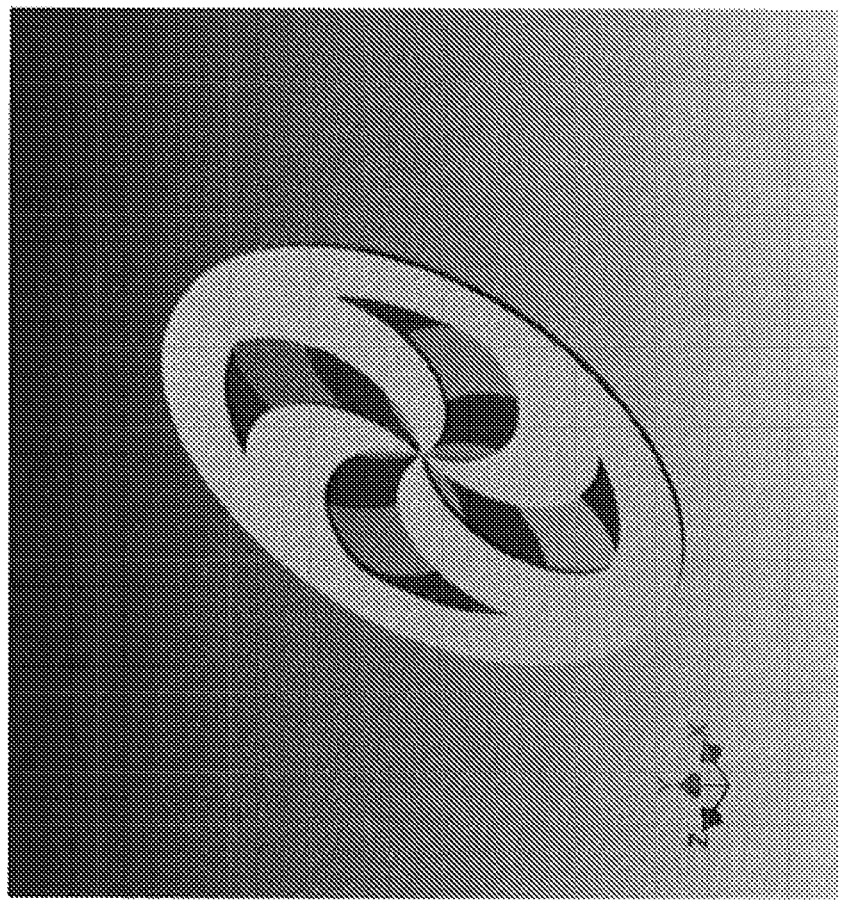
FIG. 3 illustrates a two spiral overlay mask in accordance with the claimed invention.
Figure 4:
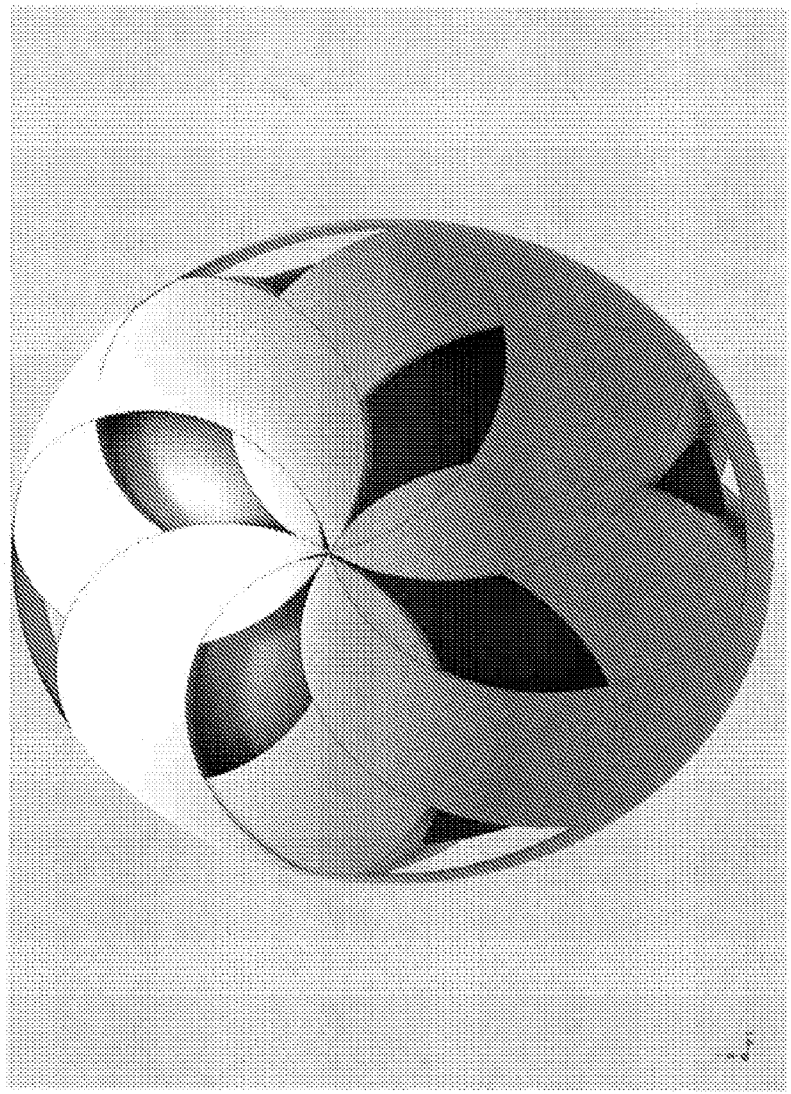
FIG. 4 shows a two-dimensional spiral mask projected onto a spheroid to realize a three-dimensional spiral mask in accordance with the claimed invention.

The interference pattern generated by rotating the disks at two speeds as light L passes through their transparent portions 230 causes light L to be evenly distributed across two-dimensional space. Additional examples of the rotary space slicing shutter disks are shown in FIG. 3, which is an example of a two spiral mask overlay in accordance with the claimed invention, and in FIG. 4, which shows a two-dimensional spiral mask projected onto a spheroid to realize a 3D spiral mask in accordance with the claimed invention. Regardless of the disk configuration and geometry, interference patterns moving both away from the center of the disk(s) and around the disk(s) through a continuous space are formed by the combination of the disks. The interference patterns together move through the entirety of the imaged space.

Returning to FIG. 10, a rotary shutter position sensor 1200 measures and records the position of the rotary space slicing shutter 1100 of the system. That is, the rotary shutter position sensor 1200 measures the position of the disks as they spin. Rotary shutter position sensor 1200 can include one or more optical or magnetic sensors that measure the current position of the disk(s) of the rotary space slicing shutter 1100. The positional information of the rotary space slicing shutter 1100 is used in processing the sampled energy data to reconstruct the hyperspectral image (described further below).

The light distributed across two-dimensional space exits the rotary space slicing shutter 1100 and is fed through optics components 1500 to one or more high-speed samplers, such as electromagnetic sensors 1300. Optics components 1500 can include one or more lenses, prisms, filters, fiber optic cables, and other optical devices that can be used to enhance or otherwise affect the light waves exiting the shutter 1100. These optical devices can refract, converge, diverge, transmit, absorb, alter, manipulate, and/or measure electromagnetic radiation. The optical components 1500 can be used to split the electromagnetic radiation into several frequency bands feeding separate sensors 1300 for the purpose of sensing individual frequency bands. The optical components 1500 can also be used to allow the shutter 1100 to be separated at some distance from the sensors 1300. In configurations containing fewer or smaller sensors 1300, the optical components can be used to collect the light from a wider shutter aperture and to concentrate it onto a smaller sensor surface.

The sensors 1300 measure the light energy. The sensors 1300 are placed on the side of the shutter 1100 opposite to the light L entering the aperture 1600. As light rays are sliced by the rotary shutter 1100, samples of electromagnetic energy of the desired frequency or frequencies are taken at a high rate by the sensors 1300.

The sampled energy data measurements are provided to the computer device 1400 (processor). Computer device 1400 processes the sampled energy data using a number of methods (described further below) and builds a model of the current position of the rotary space slicing shutter 1100 and projects virtual rays or wave fronts of the sampled energy back to a focal plane of interest. That is, the known shape and rotational positions of the physical masks are used in combination with a set of purely mathematical lenses to ray trace the distribution of the light had it passed through said lenses. The focal plane of the image can then be modeled to any distance by selecting a set of mathematical lenses to focus the distributions to any plane in front of the aperture. This distribution is used as one mathematical constraint (equation) in a set of many constraints (equations). The image at the virtual array is the solution to this set of constraints. Then the energy level falling on a given virtual pixel is estimated using the model of the aperture, shutter, and focal plane. Each virtual pixel value is time averaged by the computer device 1400 to build an estimate of the hyperspectral image of the sampled light. This sampled energy data is then used in conjunction with the shutter sensor data to produce a hyperspectral image.

Producing the Hyperspectral Image

Figure 11:
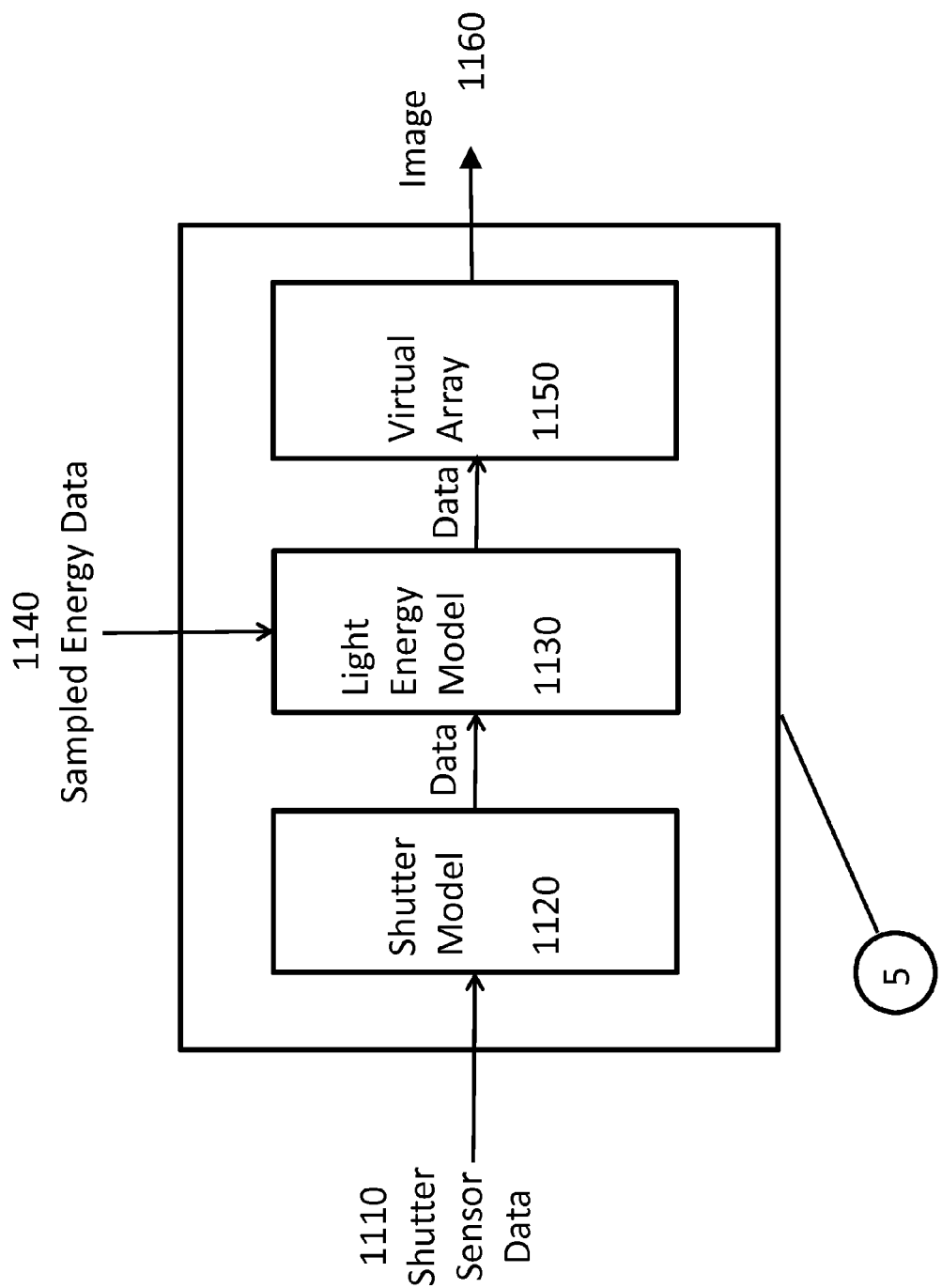
FIG. 11 shows a process flow diagram used to convert shutter sensor data and sampled energy data to produce a hyperspectral image in accordance with the claimed invention.

The manner in which the sampled energy data and the shutter sensor data are used by computer device 1400 to produce a hyperspectral image is outlined in FIG. 11. In one example implementation of the claimed invention, shutter sensor data 1110 from shutter position sensor 1200 is processed using a shutter model, such as the shutter model 1120 shown in FIG. 11. When the shape and rotation of the (spirals) masks is known, the distribution of the energy over the spirals can be modeled. Shutter model 1120 uses the shape and rotation of the spiral masks to generate an energy distribution for that particular spiral/rotation combination and to correlate in time an estimate of the state of the shutter with regard to the sampled energy data.

In the process flow diagram illustrated in FIG. 11 to build a hyperspectral image using the system of the claimed invention, the sampling space of the light must be defined, and the energy of the rays of the light is examined to determine the distribution of the energy over the sampled space. The energy distribution data from the shutter sensor model 1120 is used as an input to light energy model 1130. The sampled energy data 1140 from the sensors 1300 is also an input to the light energy model 1130.

Photon Mask (Light Energy) Model

Light energy model 1130 models the photons passing through the mask. A simple photon model using rays from an ambient source crossing through the plane of the mask and collecting at the virtual array can be described mathematically. Diffraction and near-field effects can be optionally addressed as well. The light energy model 1130 is used to generate energy distributions for many rotational configurations of the masks. These energy distributions are saved in a database for use with the reconstruction algorithms (that is the ring solution and the least-squares optimization routines described below) to generate the hyperspectral images. In one example implementation, the light energy model is programmed in a graphics processing code and run in computing instances of a data center. For example, NVIDIA CUDA code, and a set of Amazon EC2 instances supporting the NVIDIA architecture can be utilized to speed the database computation. Of course, other code and instances can also be used to perform the computation. Light energy model 1130 uses these inputs to produce a virtual array 1150 from which a hyperspectral image is produced.

To produce virtual array 1150 the set of distribution constraints (equations) created as an output of the light energy model 1130 is solved. The image at the virtual array, that is the energy values of each pixel in the virtual array, is the spatial solution to the entire set of distribution constraints defined by the light energy model 1130. The value of the virtual array after solving is the hyperspectral image.

Define Sampling Space

Figure 1:
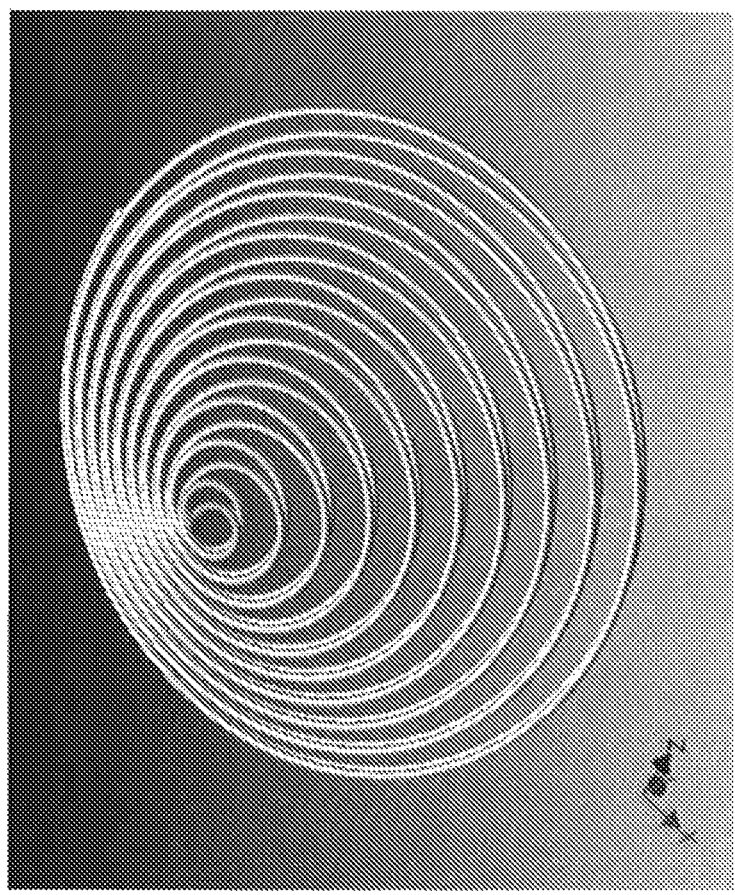
FIG. 1 shows a 3D spiral coil mask in accordance with the claimed invention that is used to define the configuration of EMR rays before they reach a sensor.

As shown in block 505 of FIG. 5A, the sampling space of the light must be defined. For example, the simplest form of mask in a two-dimensional space is a closed shape. To provide a spatial context, the chosen mask must cover the entire sampling space under examination. That is, the chosen mask must cover the entire area in which the light provides illumination. The shape of the mask must both include and exclude every light ray over a period of time. A perfect-shaped mask would also uniformly cover the two-dimensional space over time, with all regions being equally covered. As illustrated in FIG. 1, based on these criteria, a rotated spiral is the simplest geometric shape that both covers the two-dimensional space and uniformly samples the space over time.

Multiple disks can be incorporated in a similar fashion. For example, two or more spirals are spaced some distance apart and incident light falls on the combination of the spirals. As the spirals cover the entire two-dimensional space, all light ray vectors crossing through the planes of the spirals are intersected. That is, all light rays through the three-dimensional space that pass through the two-dimensional space defined by the spirals are both included and excluded in all measurements over some time t. This defines a spatial context over time and in mathematical terms eliminates the need for a lens. As the number of samples in time increases, the estimate of the energy of each ray can be more precisely determined. As these ray estimates become more refined, they approximate the true wave field. With complete knowledge of the wave field, an image of any focal plane in the field of view of the aperture can be generated. By eliminating the lens and the array, a simpler, effective, and less expensive imager can be built that can process the full spectrum of wavelengths of interest.

As outlined above, this process can be extended into three dimensions. Two or more three-dimensional spirals, one within the other, can be rotated to intersect light rays through the entire space they cover. If an energy sensor is placed within the spirals, or a method of transferring the energy to a location where the energy can be sampled (for example, fiber-optics can be used), the entire hemisphere can be imaged at once. This configuration allows for 360° hyper spectral imaging from a single lens-less sensor.

Select Mask Shape

Based upon the nature of the sampling space, a mask shape can be determined and selected as shown in block 510 in FIG. 5A. The mask shape determines how often each light ray is sampled. There are many options in defining a spiral and a spiral mask. A spiral can be defined to have the same opaque width throughout, to increase in width over the spiral's radius r or to taper in width over the spiral's radius r. The spiral can have a single continuous arm or one or more blades. As outlined above, a number of example implementations of spirals are illustrated in FIGS. 1-4. The selection of the mask should account for the frequency bands of interest and the accommodation of the type and configuration of the sensors 1300. The density of the set of masks affects the amount of light reaching the sensors throughout sampling. The density should be chosen to avoid saturating the sensors 1300. Furthermore, electromagnetic waves will be reflected when the greatest distance between spiral loops of the mask is less than the electromagnetic wavelength. The choice of mask density should account for the lowest frequency of interest to avoid reflecting the majority of the energy at that frequency.

The mask need not be defined by blocking rays. A Fresnel lens cut into a spiral configuration could just as easily allow the sensor 1300 to sum the intersection of energy. In this configuration the light that fails to reach the sensor 1300 is the light that misses the intersection of the shaped Fresnel lenses. One advantage of this configuration is that enormous apertures can be created inexpensively. As the ability to produce an image is no longer dependent on the image existing physically at the focal point, the distorting effects of the Fresnel lens are not of consequence. As long as the total energy reaches the sensor 1300, the shape the rays take after leaving the mask is of no concern. This implementation is well suited to the exoscale aperture. Spirals cut from light weight polycarbonate Fresnel lenses can be built to extreme scale.

As shown in block 515 of FIG. 5A, after the shape of the mask has been defined, a database must be built to describe with high precision the distribution of the energy crossing the mask. This database distribution set is computed using a photon model of an ambient light source at a given frequency crossing the mask and entering the sensors (shown as virtual array 1150 in FIG. 11). The distribution set becomes a look-up table mapping the set of theta vectors defining the current mask rotational configuration to a distribution of energy. To examine the energy crossing the mask shape, each ray is sampled, and the database is built to describe the distribution of the energy vectors crossing the mask shape. The completed database maps the angles of the theta vectors to a distribution of energy. The cell value of the database represents the energy at that pixel of the sensor 1300. By examining the energy crossing the mask shape and evaluating the rotation values of various masks, a determination can be made as to which ring—that is which linear equation set—will be used for a particular sample acquisition. An optional virtual lens can be mathematically incorporated to allow the energy distribution to be computed at any desired focal distance.

Figure 5B:
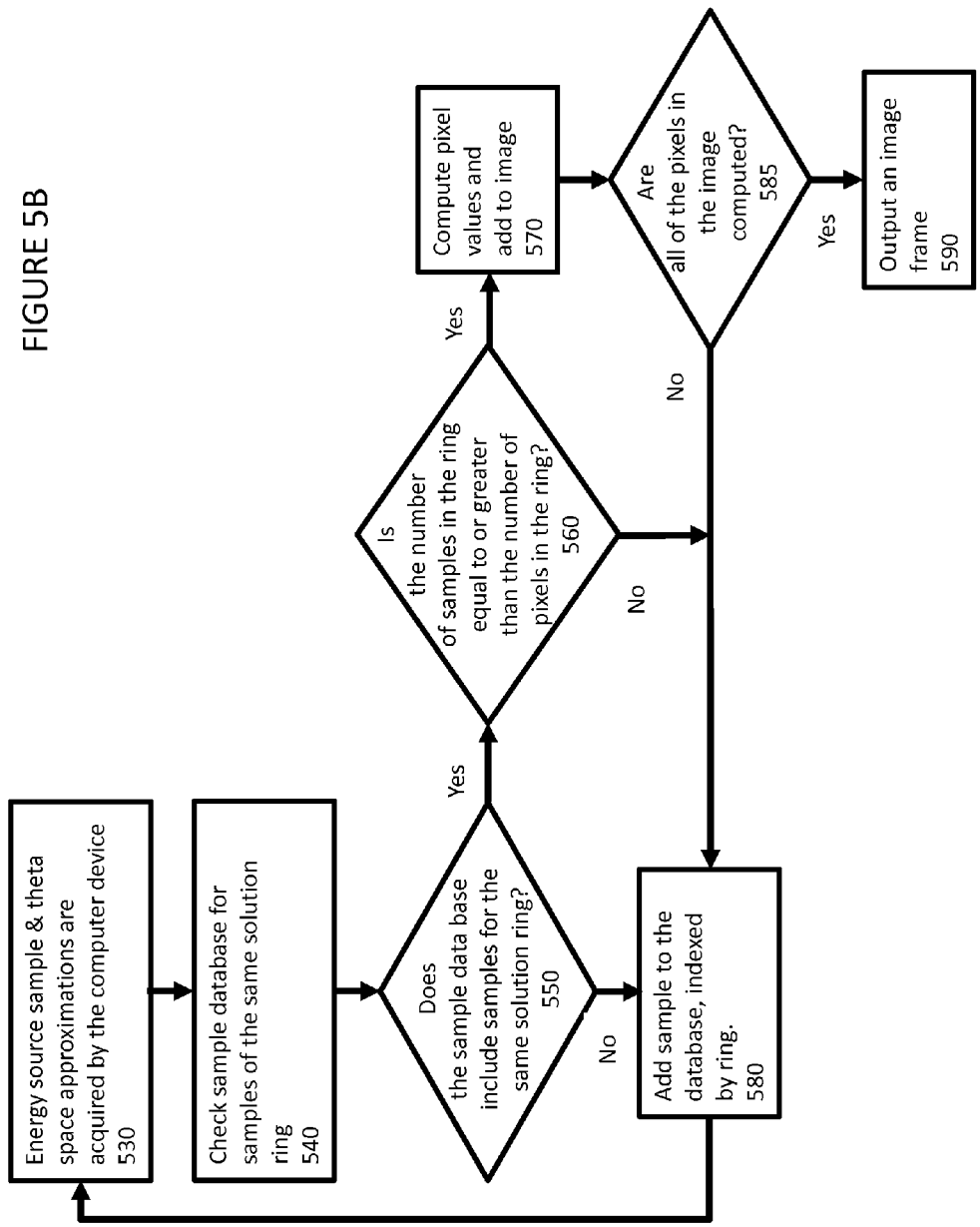
FIG. 5B shows a process flow chart for computing an image output using a ring algorithm in accordance with the claimed invention.

Once the database is built to describe the energy distribution, the process continues in FIG. 5A to block 520. As outlined above, the hyperspectral image can be computed by a number of methods, such as by building a 3 angle dimension field and sampling through the field in time (ring algorithm), or by using least mean squares minimization to identify a solution set of linear equations where each sample of the image is a high dimensional element of the array. A specific subset of mask definitions is used in the ring algorithm. The ring algorithm is used with the spiral slit masks described in detail below. If a mask is a different geometry such that either algorithm can be used, in block 520, a determination is made whether to use a ring algorithm to build a 3 angle dimension field and sample through the field to compute the image or whether to use a pseudo inverse algorithm to identify a solution set of linear equations to compute the image. For example, if computational resources are limited, in block 520 a determination would be made to use a ring solution to generate the hyperspectral image, and the process would continue to FIG. 5B. If computational resources are less constrained, in block 520 a determination would be made to use a least mean squares minimization solution to generate the hyperspectral image, and the process would continue to FIG. 6.

As outlined above, two reconstruction algorithms are described below. The first reconstruction algorithm, the ring solution, utilizes a specific type of mask (spiral slit mask) to fit the light energy into many small sets of linear equations situated in rings symmetrically around the rotation point of the shutter. This spiral slit type of mask requires specific configurations of spiral slits described in detail below. The sets of equations are solved to estimate the energy arriving through the spiral slit mask at each synthetic array element.

The second reconstruction algorithm is a least-squares optimization of the energy distribution sample matrix. This least-squares algorithm finds the solution of the wave field entering the aperture by ray tracing many distributions, one for each sample, through the known rotational parameters of the masks at the time each sample was taken and resolving them to the sampled light energy values.

The Ring Solution

Figure 7:
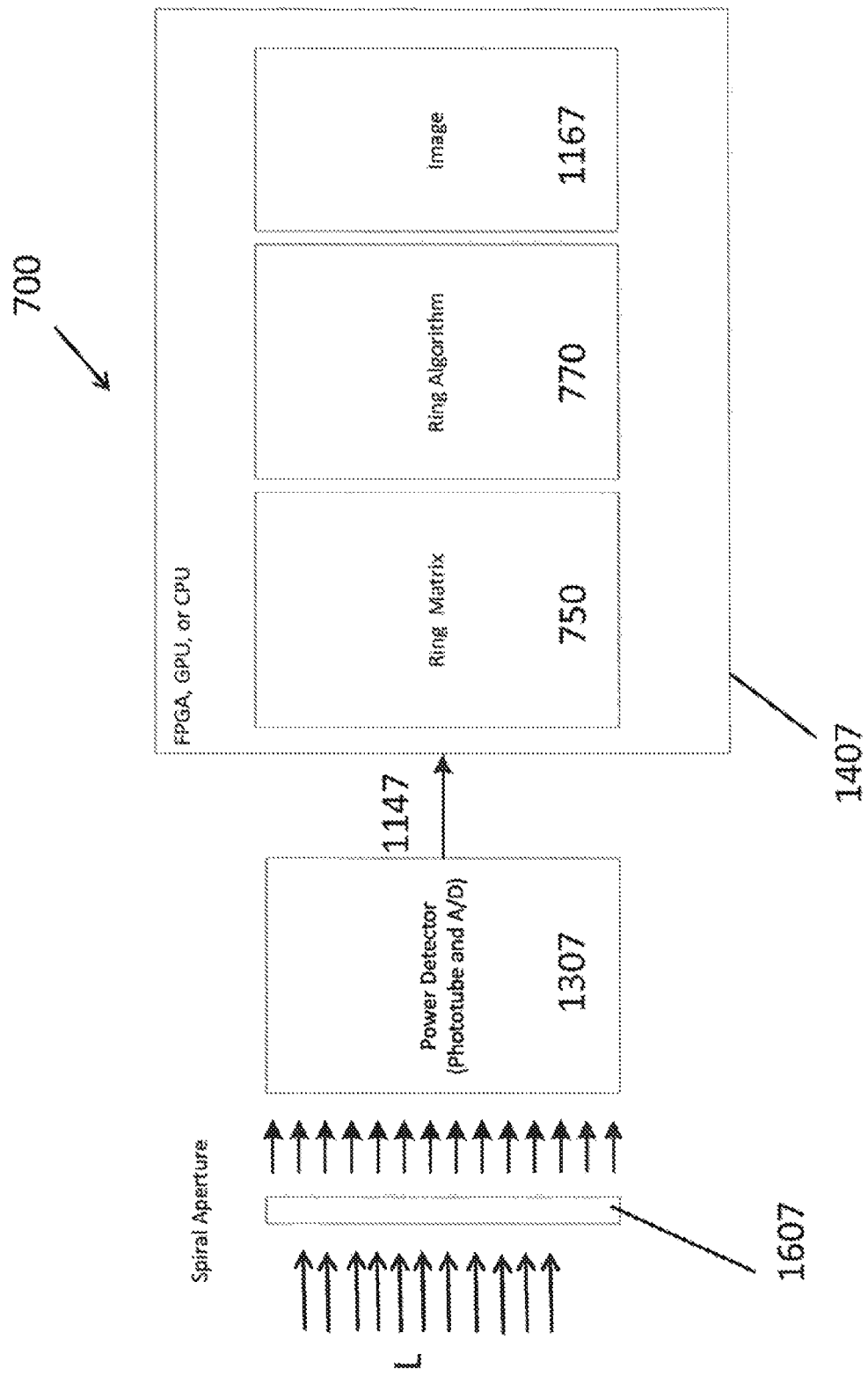
FIG. 7 illustrates a data flow process when acquiring and processing data using a ring algorithm in accordance with the claimed invention.

When a determination is made in block 520 that computational resources are limited, the process continues to block 530 in FIG. 5B, where a ring solution process is implemented to compute the hyperspectral image. A modified block diagram of the system 700 using a ring solution is shown in FIG. 7. In FIG. 7, light L enters spiral aperture 1607 and is detected by power detector (sensor) 1307. Power detector 1307 provides the sample energy data measurements 1147 to computer device 1407. In one example implementation, computer device 1407 can be an FPGA, GPU, CPU, or other processor. Computer device 1407 processes the sampled energy data using the ring matrix 750 and ring algorithm 770 to produce hyperspectral image 1167.

To compute the image using a 3 angle dimension field and sampling through the 3 angle dimension field in time, a ring solution can be employed. The 2D space is scanned in a ring of linear equations, and power levels at each point in the 2D space are computed. These power levels are used to build the entire focal plane. Multiple ring solution systems can also be used concentrically to define a vector distribution of the power levels to approximate the wave field. The focused image can then be computed using these vectors.

The ring solution utilizes the geometry of curved slit intersections to define a theta-space.

Begin with the limiting case a single spiral slit in a disk intersecting a single ray slit in a disk:

The two disks will intersect at point p blocking all light but the light at point p. If the rotation of the spiral disk is described by $\theta_1$ and the rotation of the ray disk is described by $\theta_2$, an orthogonal basis ($\theta_1$, $\theta_2$) can be formed over the entire space of the disk. Further, a mapping can be formed from the (x, y) Cartesian space into the ($\theta_1$, $\theta_2$). The distance r from the center of the disks will be determined by the difference between $\theta_1$ and $\theta_2$, which is the phase difference of the two rotations. By varying the phase, r can be moved to an arbitrary point between 0 and the radius of the disks. By varying $\theta_1$ and $\theta_2$ together in unison, the point of intersection can be moved through any angle of rotation $\theta$. With this elementary method the entire two dimensional space can be scanned measuring the power levels at each point and building the entire focal plane. No random sampling is necessary. No minimization is needed. Each point is sampled independently.

Figure 15C:
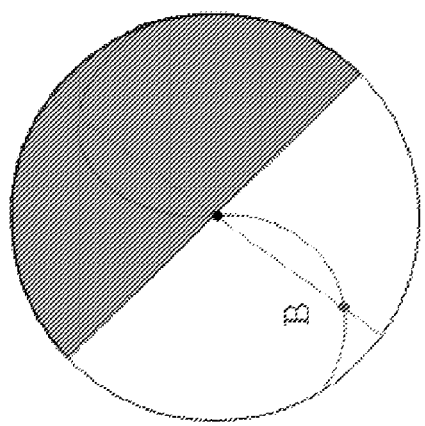
FIG. 15C shows an angle of the blocking disk's rotation in a method of the claimed invention.
Figure 15B:
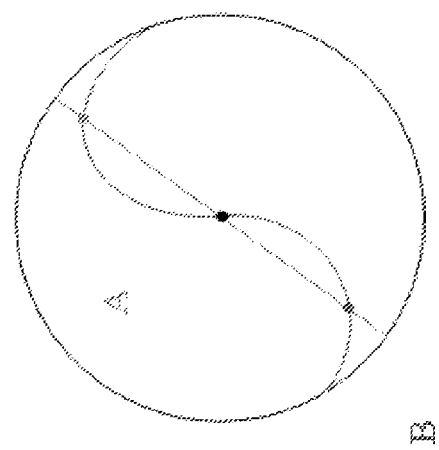
FIG. 15B shows a method of the claimed invention extended to two symmetric spiral legs.
Figure 15A:
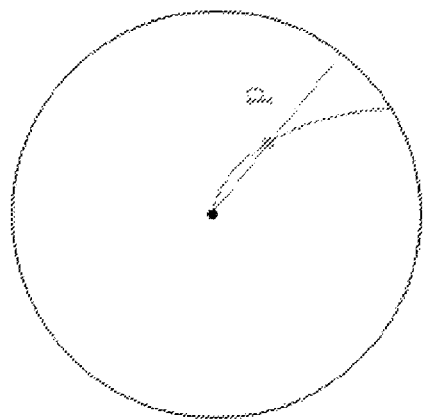
FIG. 15A shows a single spiral slit in a disk intersecting a single ray slit in a disk.

This method can be extended to two symmetric spiral legs as shown in FIG. 15B.

There are still two disks but now there are two points of intersection, A and B. For every $\pi$ rotation of the two disks through $\theta$, the sum of power entering through the two points $S_i = A_i + B_i$ will be sampled. This equation cannot be solved because of symmetry. To remedy this, a third disk is introduced. The purpose of this third disk is to block one of the intersecting points. This third disk will block $$\frac{2\pi}{n}$$

of the disk where n is the number of legs in the spiral disk. The angle of the blocking disk's rotation is described by $\phi$ as shown in FIG. 15C.

Now, there will always be only one intersection point visible in any sample.

Additional sample points can be added to the ($\theta_1$, $\theta_2$, $\phi$) space by adding legs to the spiral disk. Take the four point case as shown in FIG. 15D:

In this case, three of the points in our ring distribution will be sampled forming a set of linear equations.

$$B+C+D=S_1$$

$$C+D+A=S_2$$

$$D+A+B=S_3$$

$$A+B+C=S_4$$

This set of four unknowns can be solved using the four samples.

Figure 15E:
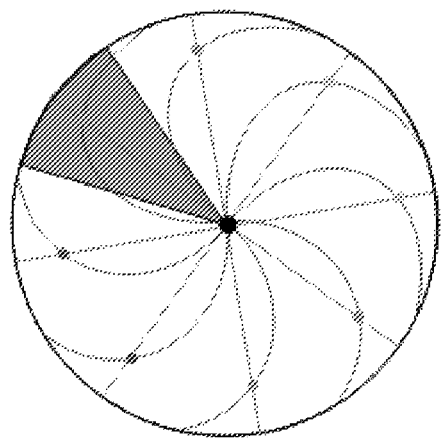
FIG. 15E shows an additional number of legs and tightening the angle of the spiral to add additional sample points to the space in a method of the claimed invention.
Figure 15D:
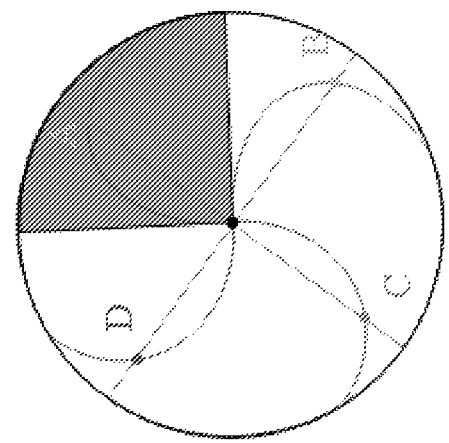
FIG. 15D shows an example four point case with legs added to a spiral disk in a method of the claimed invention.

By continuing to add legs and tightening the angle of the spiral, an additional number of sample points can be added to the space as shown in FIG. 15E.

When the spiral is tightened such that its slope twists it around the entire disk, points of varying r can be added to the set of linear equations. This allows a sampling ($\theta_1$, $\theta_2$, $\phi$) architecture to be built that distributes the energy over the entire surface of the disk set while maintaining a very simple calculable set of unknowns to find each point analytically.

Figure 12:
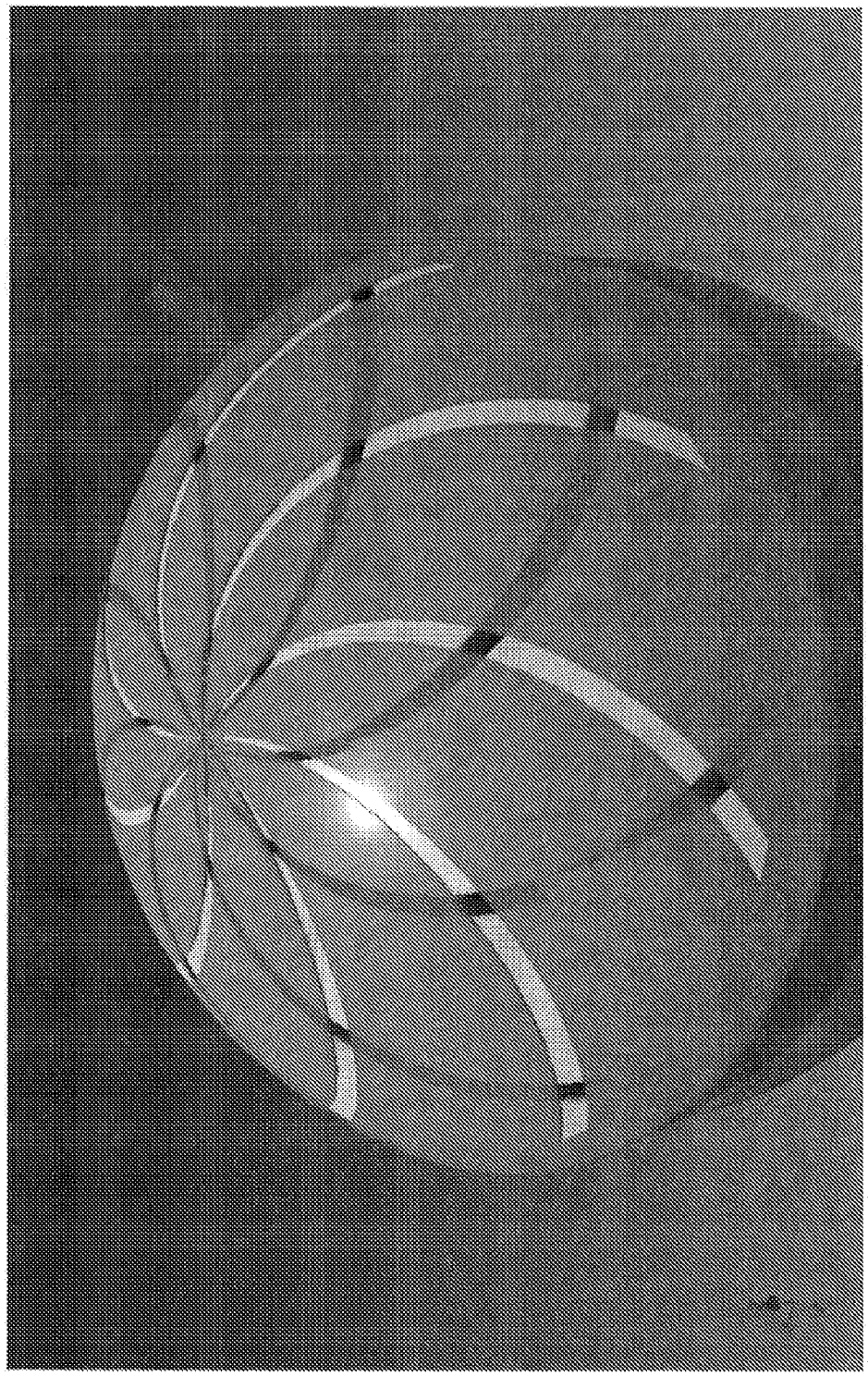
FIG. 12 illustrates a spiral ring mask projected onto a hemisphere in accordance with the claimed invention.

This architecture can be extended to a 360° field of view by projecting the entire setup onto a set of concentric rotating hemispheres. Similarly, the setup can be projected onto a set of concentric rotating spheres when the blocking disks are extended with two anti-symmetry blocking spheres to maintain cyclical linear equations. An example of such a projection can be seen in FIG. 12.

Once the entire space can be defined as a set of 2D points, two such systems concentrically in a set of 6 concentric hemispheres can be used to define a vector distribution. The same principles apply, and a distribution of vectors intersecting both hemispherical spaces is realized. Using ray tracing and knowledge of the vector field to an arbitrary precision, the vector field can be algorithmically focused. Any type of simulated lens can be used. In the case of the hemisphere or spherical implementation, the simulated Luneburg lens is of particular interest. A physical implementation of a wide band Luneburg lens is impractical, but by using the distributed masking architecture of the claimed invention, an image can be generated that closely approximates the image a wide band Luneburg lens would have created if it were possible to physically build one.

The spiral mask geometry of the claimed invention enables the creation of theta-space rotational masking architectures that result in simple cyclical linear equations. Without the spiral mask, it would be very difficult to find the pseudo inverse at the high rate of the incoming samples. Additionally, it would be a daunting task to design a DLP mirror or LCD array of sufficient resolution to physically sample the vector space, neither of which would operate over a wide band of frequencies.

Additional combinations of spirals can be employed in random sampling systems. For example, a scheme that uses the distribution of rays through a number of concentric hemispherical springs as in FIG. 1 to create a uniform random basis can be used.

As shown above with regard to FIG. 10 and shown in block 530 of FIG. 5B, the measured sampled energy data (source samples) from the hyperspectral imaging sensor(s) 1300 are provided to the computer device 1400 (processor) in block 530. Also provided to the computer device 1400 are the theta-space approximations calculated using the ring solution above.

In block 540, the sample database is checked to determine if samples of the same solution ring exist. That is, the rotational sensor measurements for the current sample are compared with the rotational sensor measurements of previous samples to determine if samples within the same ring already exist.

If, in block 550, the sample database does not include samples for the same solution ring, the process continues to block 580 where the sample is added to the database, indexed by the solution ring. The process then returns to block 530 where the next sample is evaluated.

If, in block 550, the sample database includes samples for the same solution ring, the process continues to block 560. In block 560, the number of samples is compared to the number of pixels in the ring. Each pixel is an unknown. Each sample is a linear equation. To solve the problem and reconstruct a hyperspectral image, at least as many equations as unknowns are needed. If, in block 560, the number of samples is not equal to or greater than the number of pixels in the ring, the process continues to block 580 where the sample is added to the database, indexed by the ring, and the process returns to block 530 and resumes.

Once the number of samples is equal to or greater than the number of pixels in the ring, as determined in block 560, the pixel values are computed and added to the reconstructing image in block 570.

In block 585, a determination is made as to whether all of the pixels in the image have been computed. If there are pixels remaining that have not been computed, the process returns to block 580 where the sample is added to the database, indexed by the ring, and the process returns to block 530 and resumes. If, in block 585, all of the pixels in the image have been computed, the process moves to block 590 where an image frame is output.

The Pseudo Inverse Solution

Figure 6:
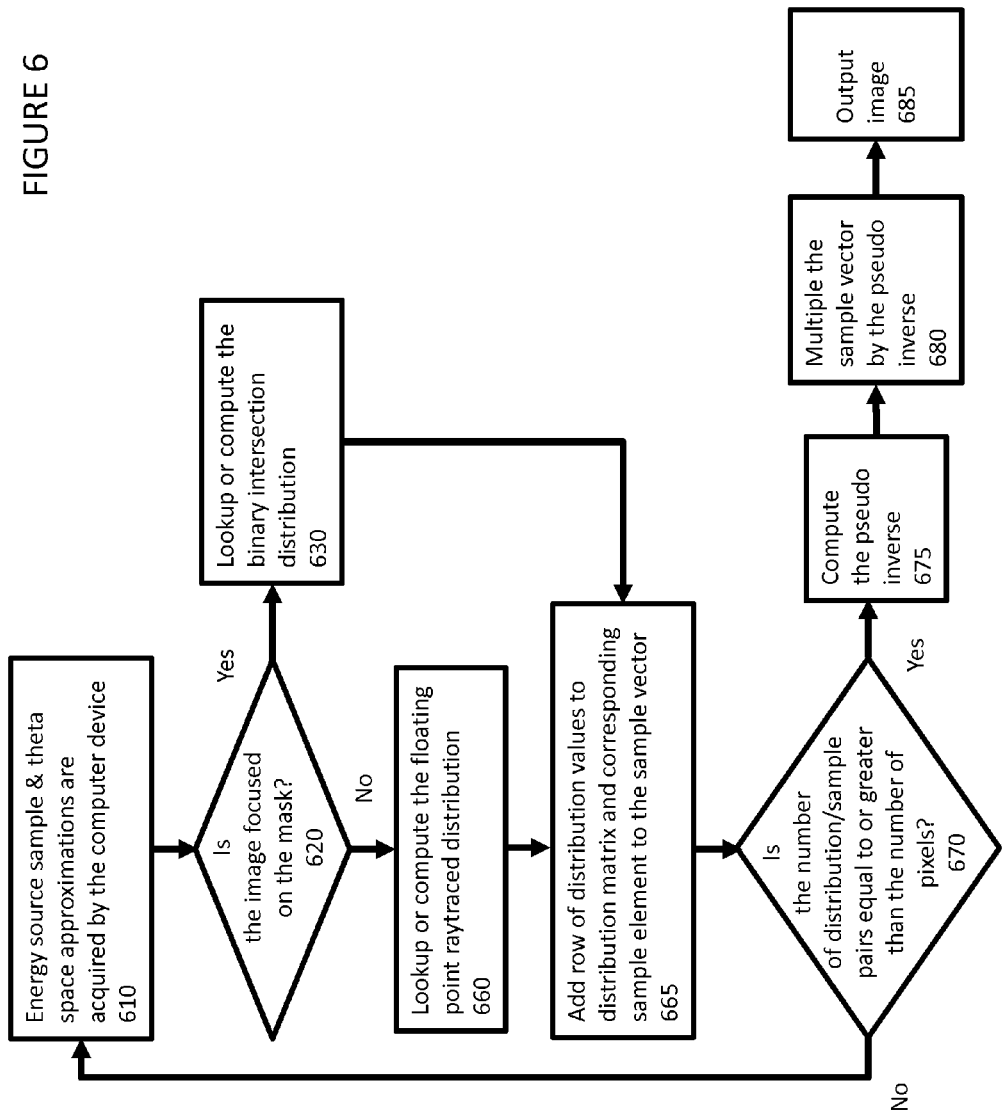
FIG. 6 shows a process flow chart for computing an image output using a pseudo inverse algorithm in accordance with the claimed invention.
Figure 8:
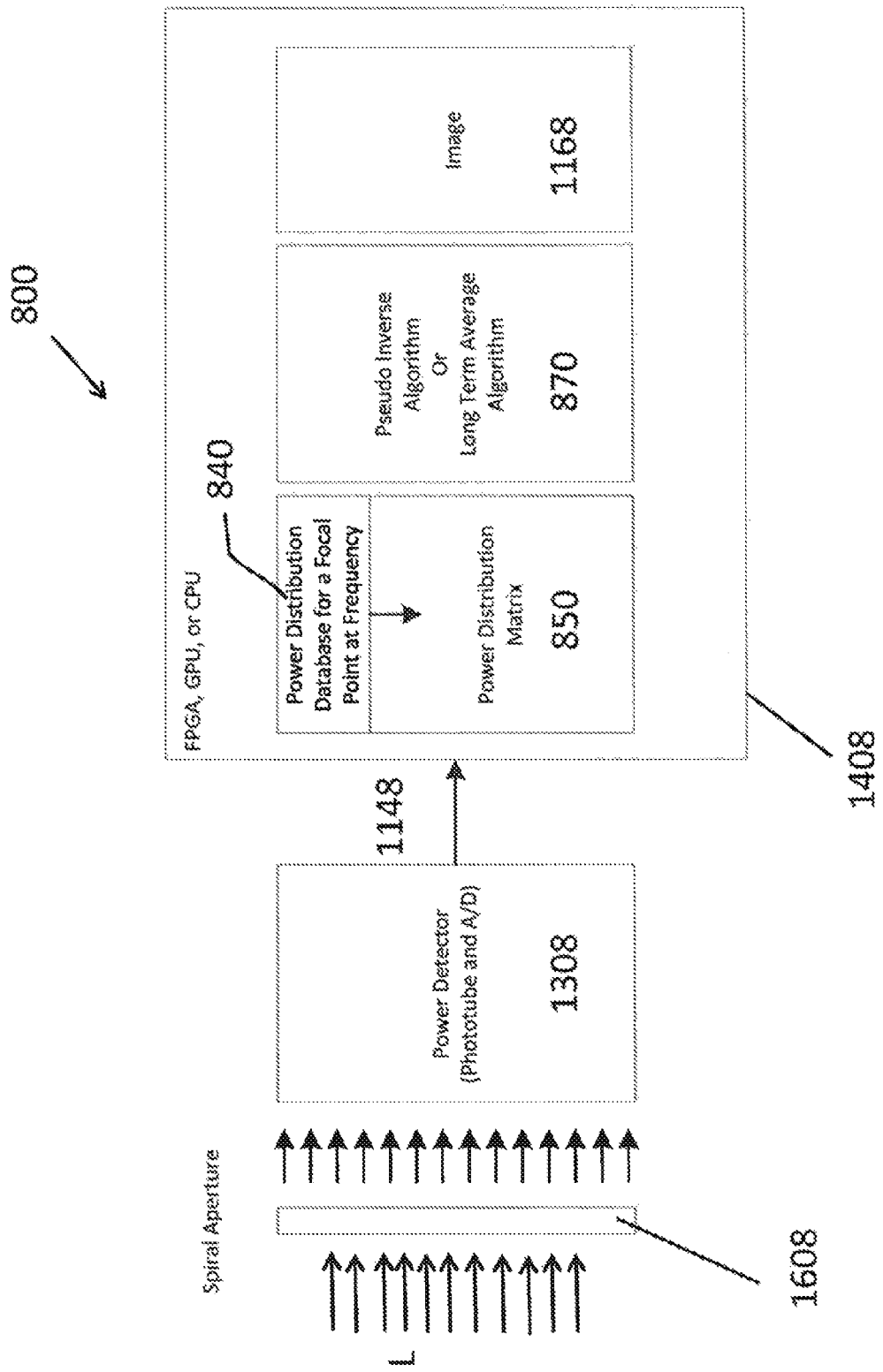
FIG. 8 illustrates a data flow process when acquiring and processing data using a pseudo inverse algorithm in accordance with the claimed invention.

As outlined above with regard to block 520 in FIG. 5A, for those environments where computational resources are not constrained, the image can be created using a least mean squares minimization as shown in the process flow diagram of FIG. 6. Additionally, a modified block diagram of the system 800 using a pseudo inverse solution is shown in FIG. 8. In FIG. 8, light L enters spiral aperture 1608 and is detected by power detector (sensor) 1308. Power detector 1308 provides the sample energy data measurements 1148 to computer device 1408. In one example implementation, computer device 1408 can be an FPGA, GPU, CPU, or other processor. Computer device 1408 processes the sampled energy data 1148 using the power distribution database for a focal point at frequency 840 and power distribution matrix 850 with pseudo inverse algorithm 870 to produce hyperspectral image 1168.

Returning to the process flow diagram of FIG. 6, in this pseudo inverse solution environment, the energy source samples are received by computer device 1400 and evaluated in block 610. In one example implementation of the claimed invention, the hyperspectral image can be computed using a least mean squares minimization. To perform this method, a solution set of linear equations can be identified where each sample of the image is a high dimensional element of the array (database).

If the image is focused on the mask in block 620, full ray tracing is not necessary to determine the energy vectors. In this environment, the process continues to block 630 where the energy vector distribution is found by generating the binary intersection of the rotated masks or looking up the binary intersection in a pre-computed database. In this example implementation, each row of the energy vector database will contain the intersection of the masks as they are currently rotated. It is akin to looking out through the aperture and seeing only the light that misses the masks. If you added up this observed energy, the total is the sum of the value of all of the empty spaces seen through the set of masks. This entire image of the mask is a single row in the energy vector database. The energy vector database will be binary, consisting of 1s where the light makes it through the masks and 0s where the light does not make it through the masks. Once this binary energy vector distribution is found in the pre-computed energy vector database, the process continues to block 665 where the row of distribution values is added to the distribution matrix and corresponding sample element to the sample vector.

If the image is not focused on the mask in block 620, theta values of the mask components are used to ray trace the energy vector distribution in block 660 or a pre-computed ray traced distribution is retrieved from a database. For these cases, where there is no binary distribution, each of the masks affects the energy vector distribution continuously, casting smooth shadows on the distribution. Rather than the binary distribution above, the energy distribution consists of floating point values. As before, each different rotation of the mask creates a new distribution, which creates a new equation, which is represented by a new row in the distribution matrix. In block 660, the energy vector distribution is ray traced or a pre-computed distribution is retrieved from a database and the resulting distribution values are added as a row in the distribution matrix while a corresponding sample element is added as an element to the sample vector as shown in block 665. In block 670, a determination is made as to whether the number of distribution-sample pairs is equal to or greater than the number of unknown pixels.

If the number of distribution-sample pairs is not equal to or greater than the number of unknown pixels, the process returns to block 610 and the next sample enters the system, the next energy vector distribution is ray traced, another row of database values is added to the distribution matrix, and another corresponding sample element is added to the sample vector.

In block 670, once the number of distribution-sample pairs is equal to or greater than the number of unknown pixels, the process continues to block 675 where the pseudo inverse is computed. A pseudo inverse solution can be used to identify the solution set. In using the pseudo inverse solution, the set of linear equations defined by the distribution matrix created in blocks 660, 630, and 665 is solved for pseudo inverse matrix which minimizes the distance between the linear equations contained in its rows.

In block 670, when enough samples of the energy data are collected to the point where the pseudo inverse can be computed, that is the number of distribution-sample pairs (rows in the distribution matrix) is at least the number of pixels in the virtual array (unknowns), then the sample vector is multiplied by the pseudo inverse in block 680. That is, the pseudo inverse is used to solve for a least mean squares approximation of the unknown image. The result of the multiplication is the image which is output in block 685.

Optional image corrections can be implemented to the data sets as well. For example, corrections for diffraction and for Doppler effect can be included and applied to the distributions in the database. Diffraction corrections affect the distribution dependent on light frequency. Doppler effect corrections also affect the distribution as a function of light frequency and as a function of mask rotation speed. For a given frequency and mask rotational speed, the distributions can be recomputed in the matrix database, and carried through to the pseudo inverse and the resulting image. When a hyperspectral image is computed over a wide range of frequencies, many separate matrices' databases can be computed, each corresponding to a separate frequency band.

Measuring and Estimating Mask Rotation

There are several methods that could be used to measure and estimate the rotation of the masks. In one method the shutter position sensor 1200 in FIG. 10 consists of a set of interferometers and is used to determine the precise rotation of each spiral. In another, 1200 consists of one or more photo detectors counting the crossing of notches on the rim of the spiral to measure rotation. In a third approach the actual measurements from 1200 are combined with knowledge from the sensors 1300. When both spirals become aligned, the energy entering the sensor is at its peak. The peaks over time can be used to estimate the group velocity of the spirals' interference. If the rotation of one spiral is defined to always be greater than the other, the peaks can be used to estimate the rotational velocity of each spiral. This sensor-feedback model can be used to enhance the raw measurements from the rotation sensors 1200.

Polarization Encoding within the Mask

Polarization selection can be utilized within the rotating shutter 1100 to increase the number of samples from the sensors 1300 available to the computer device 1400 at any given time. In this configuration a polarizing material is chosen to build the mask. As the mask spins it will block light at a particular polarization. The light exiting the mask is then collected and split into several sensors 1300. Each of the sensors is filtered at a particular angle of polarization and fitted with an independent A/D. Because each sensor is polarize-filtered at an independent angle, each sensor will have a different view of the energy density. By this means the output of the A/Ds will be interleaved within a single sample. Using this method the amount of information available to the computer processor within any unit of time is increased many fold. The disadvantage of this method is that it is not polarization-preserving. In instances where polarization provides useful information about the subject, this method is not optimal.

Bessel Mask Shutter

Figure 13:
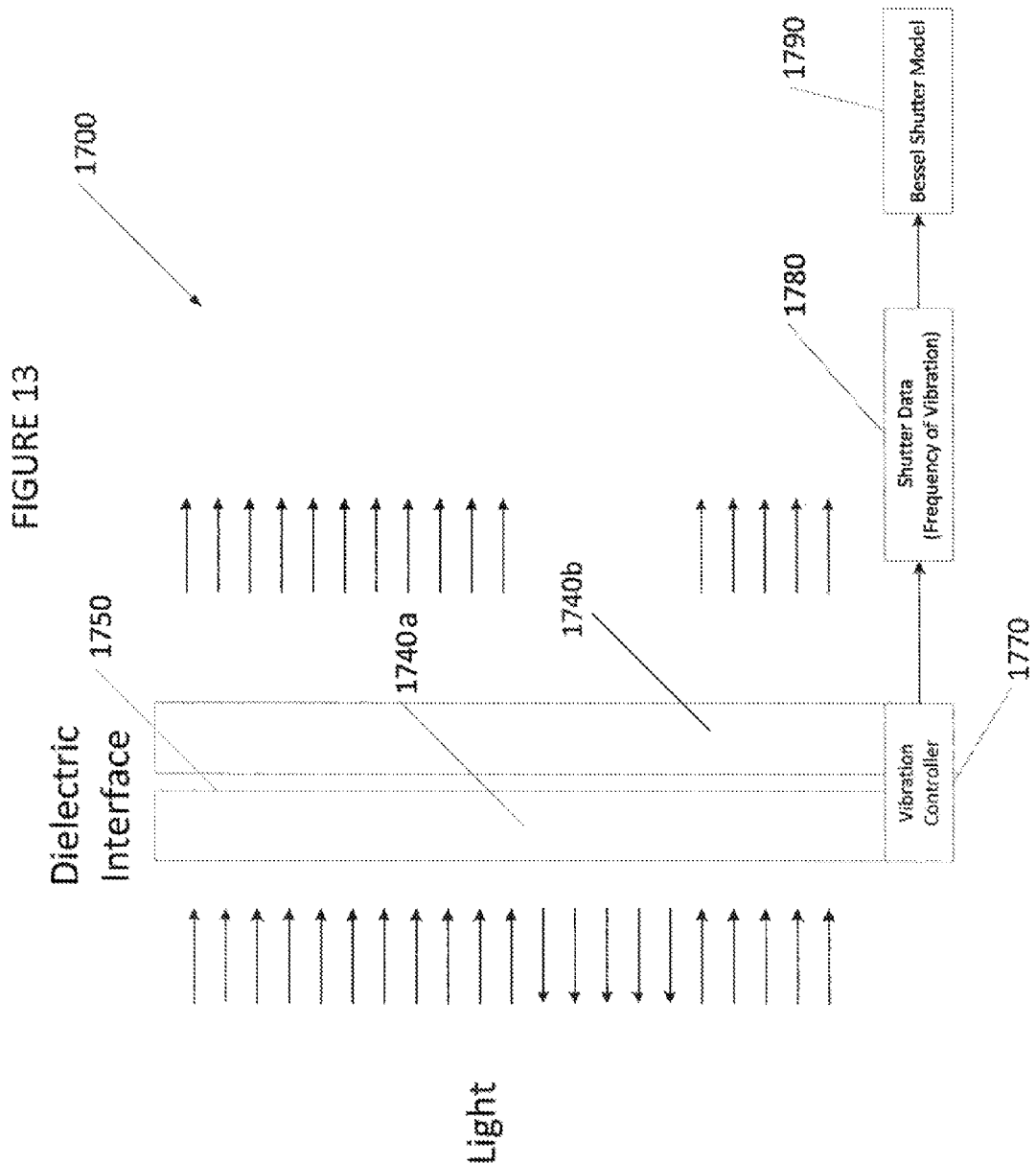
FIG. 13 illustrates a Bessel mask shutter in accordance with the claimed invention.
Figure 14:
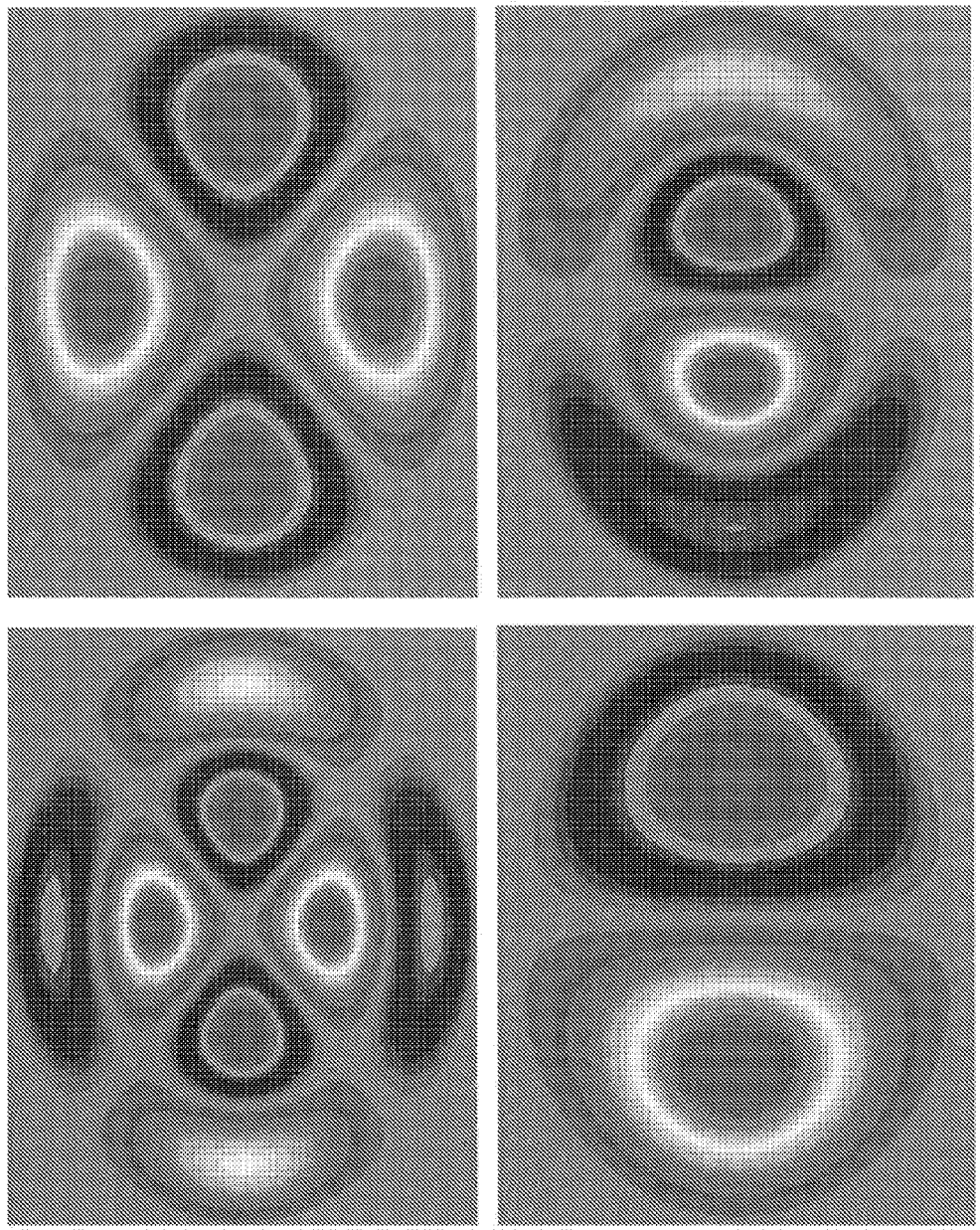
FIG. 14 shows masking shapes generated by a Bessel mask shutter in accordance with the claimed invention.

A Bessel mask shutter 1700 in FIG. 13 can be positioned at the aperture in place of the rotating shutter. The Bessel mask shutter 1700 includes two or more parallel dielectric surfaces separated by a small distance 1750 to form two refractive interfaces 1740a, 1740b such that the amount of light transmitted or reflected depends on the distance between the two refractive interfaces 1740a, 1740b. One or more of the dielectric refractive interfaces 1740a, 1740b can be vibrated mechanically by vibration controller 1770. The vibrations change the distance between the dielectric interfaces 1740a, 1740b in both time and space. These variations result in shapes of varying electromagnetic reflectivity and transmissivity spread across the surface of the dielectric refractive surfaces. These shapes vary in time according to the frequency of vibration generated by the vibration controller 1770. The shutter data 1780 includes the frequency data points from the vibration controller 1770 are sent to the Bessel shutter model 1790 where the varying mask shapes are estimated. These mask shapes, examples of which are shown in FIG. 14, are dependent on the refractive indices of both sides of the refractive interfaces 1740a, 1740b and the frequency of vibration of the dielectric refractive interfaces 1740a, 1740b. The shapes are modeled by the Bessel shutter model 1790 using mathematical Bessel functions. This Bessel shutter model 1790 can be used as a specific implementation of the Shutter Model 1120 of FIG. 11, and the time-varying shutter distributions can be modeled as described above. Also as before, the dielectric surface (refractive interfaces 1740a, 1740b) of the Bessel mask shutter 1700 can be formed onto 3D hemispherical or 3D spherical surfaces as well as a planar disk.

MEMS (Microelectromechanical Systems) Arrays

Figure 9:
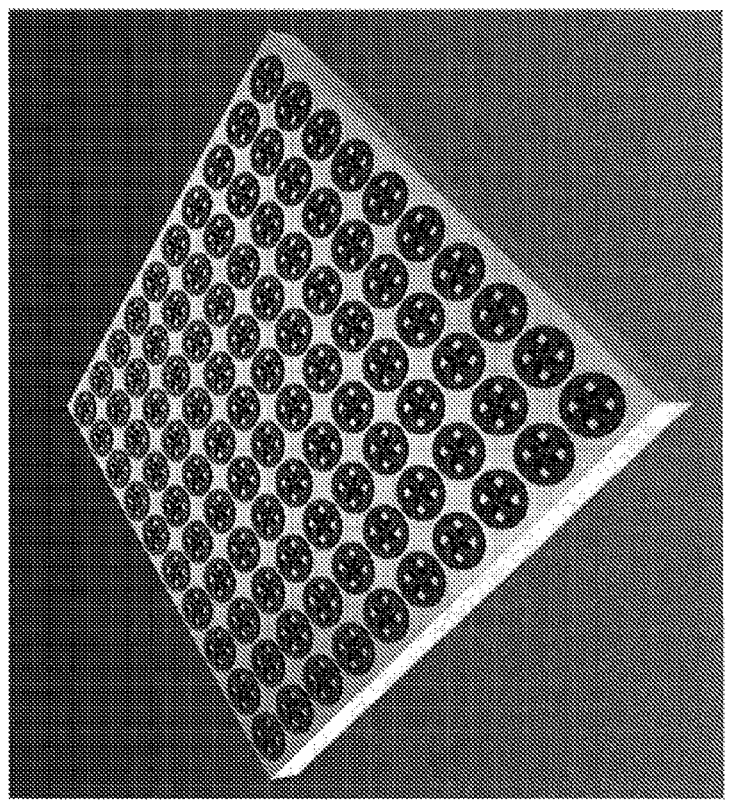
FIG. 9 shows a micro-electro-mechanical system (MEMS) array of spiral masks in accordance with the claimed invention.

While the primary advantage of the masking camera is that it eliminates the need for an array, an implementation of a MEMS array of such devices as shown in FIG. 9 can have distinct advantages. Such small components can be useful in masking the particle energy, as in electron microscopy where the particle wavelength is much less than the wavelength of spiral arms. Such an implementation, utilizing the simplest lithographic methods, may not be able to rotate the masks entirely. In such cases, the spiral mask elements can be subject to rotary torsion instead of full rotation.

Having thus described the basic concept of the invention, it will be rather apparent to those skilled in the art that the foregoing detailed disclosure is intended to be presented by way of example only, and is not limiting. In addition to the embodiments and implementations described above, the invention also relates to the individual components and methods, as well as various combinations and subcombinations within them. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

The claimed invention is:

1. A synthetic focal plane imaging system comprising:
an aperture configured to receive light;
a rotary mask configured to rotate and to transform the light from the aperture into rotational coding periods of the rotary mask;
a shutter position sensor configured to determine shutter sensor data including at least one of rotation speed, rotation direction, and rotation plane of the rotary mask;
a single pixel electromagnetic sensor configured to receive the transformed light from the rotary mask and generate sample energy data based upon the transformed light from the aperture during the rotational coding periods of the rotary mask; and
a computer device configured to receive the sample energy data and the shutter sensor data to generate hyperspectral images.

2. The synthetic focal plane imaging system of claim 1, wherein the sample energy data includes theta vectors based upon the rotary mask configuration.

3. The synthetic focal plane imaging system of claim 1 further comprising:
a shutter model configured to generate an energy distribution for the rotary mask and further configured to correlate in time an estimate of the state of the rotary mask with regard to the sample energy data.

4. The synthetic focal plane imaging system of claim 1 further comprising:
a light energy model configured to generate an energy distribution for light rays crossing the rotary mask based upon the sample energy data.

5. The synthetic focal plane imaging system of claim 1 further comprising:

an optics component configured to perform at least one of refract, converge, diverge, transmit, absorb, alter, and measure electromagnetic radiation.

6. The synthetic focal plane imaging system of claim 5, wherein the optics component is further configured to split the light from the single pixel sensor into several frequency bands to feed an additional electromagnetic sensor to sense individual frequency bands.

7. The synthetic focal plane imaging system of claim 6, wherein the optics component is further configured to collect the light from a shutter aperture and to concentrate the collected light onto a sensor surface.

8. The synthetic focal plane imaging system of claim 1, wherein the rotary mask is further configured to block light at a polarization angle and wherein the light exiting the rotary mask is collected from the single pixel sensor and split into a plurality of electromagnetic sensors and filtered at an individual polarization angle.

9. The synthetic focal plane imaging system of claim 8, wherein each of the plurality of electromagnetic sensors is configured to filter the light at an independent angle to provide an independent view of energy density of the light.

10. The synthetic focal plane imaging system of claim 9, wherein outputs of each of the plurality of electromagnetic sensors are interleaved within a single energy data sample.

11. The synthetic focal plane imaging system of claim 1, wherein the rotary mask includes a spiral slit mask configured as a closed circular spiral coil.

12. The synthetic focal plane imaging system of claim 11, wherein the spiral slit mask is further configured to intersect the light received by the aperture and to uniformly sample over time the space upon which the light falls.

13. The synthetic focal plane imaging system of claim 1, wherein the rotary mask includes a hemispherical slit mask configured as at least two three-dimensional spirals.

14. The synthetic focal plane imaging system of claim 13, wherein the hemispherical slit mask is further configured to intersect the light received by the aperture and to uniformly sample over time the space upon which the light falls.

15. The synthetic focal plane imaging system of claim 1, wherein the rotary mask includes a Bessel mask shutter configured as at least two dielectric refractive interfaces separated by a gap.

16. The synthetic focal plane imaging system of claim 15 further comprising:
a vibration controller configured to change the distance of the gap between the dielectric refractive interfaces.

17. A method of generating a hyperspectral image comprising:
receiving light through an aperture;
transforming the light with a rotating mask into rotational coding periods of the rotating mask;
determining shutter sensor data with a shutter position sensor, the shutter sensor data including at least one of rotation speed, rotation direction, and rotation plane of the rotating mask;
receiving the transformed light from the rotating mask onto a single pixel electromagnetic sensor;
converting the received transformed light with the single pixel electromagnetic sensor to generate sampled energy data based upon the transformed light from the aperture during the rotational coding periods of the rotating mask;
receiving the shutter sensor data from the shutter position sensor in a computer device;
receiving the sampled energy data from the single pixel electromagnetic sensor in the computer device;
processing the shutter sensor data and the sampled energy data in the computer device using a light energy model; and
generating a hyperspectral image based upon the processed shutter sensor data and the sampled energy data.

18. The method of generating a hyperspectral image of claim 17, wherein the light energy model includes:
acquiring, in the computer device, energy source samples and theta space approximations of the light;
comparing a sample database for the energy source samples and theta space approximations of a solution ring;
determining when the sample database includes samples for the solution ring;
determining when the number of samples in the solution ring is equal to or greater than the number of pixels in the solution ring;
adding the sample to the database when the database does not include samples for the solution ring or when the number of samples in the solution ring is not equal to or greater than the number of pixels in the solution ring;
computing pixel values when the number of samples in the solution ring is equal to or greater than the number of pixels in the solution ring;
adding the computed pixel values to the image; and
outputting an image frame.

19. The method of generating a hyperspectral image of claim 17, wherein the light energy model includes:
acquiring, in the computer device, energy source samples and theta space approximations of the light;
determining when the light is focused on the mask;
acquiring a binary intersection distribution when the light is focused on the mask;
acquiring a floating point ray traced distribution when the light is not focused on the mask;
adding a row of distribution values to a distribution matrix;
adding a sample element to a sample vector, the sample element corresponding to the row of distribution values;
determining when the number of distribution values and sample pairs is equal to or greater than the number of pixels;
acquiring an additional energy source sample and theta space approximation when the number of distribution values and sample pairs is not equal to or greater than the number of pixels;
computing the pseudo inverse when the number of distribution values and sample pairs is equal to or greater than the number of pixels;
multiplying the sample vector by the pseudo inverse; and
generating the hyperspectral image based upon the product of the sample vector and the pseudo inverse.

20. The method of generating a hyperspectral image of claim 19, wherein the shutter sensor data includes frequency data points of varying electromagnetic reflectivity and transmissivity spread across the surface of a dielectric refractive surface.

* * * * *